Figure 1:
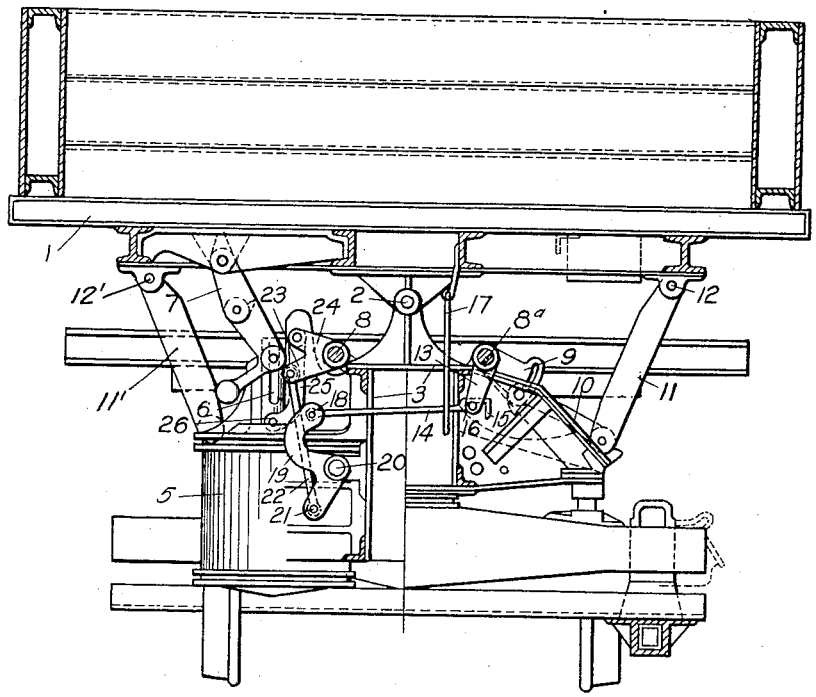

W. L. BURNER.
DUMP CAR.
APPLICATION FILED MAR. 23, 1918.

1,330,977.

Patented Feb. 17, 1920.
3 SHEETS—SHEET 1.

W. L. BURNER.
DUMP CAR.
APPLICATION FILED MAR. 23, 1918.
1,330,977.
Patented Feb. 17, 1920.
3 SHEETS—SHEET 2.
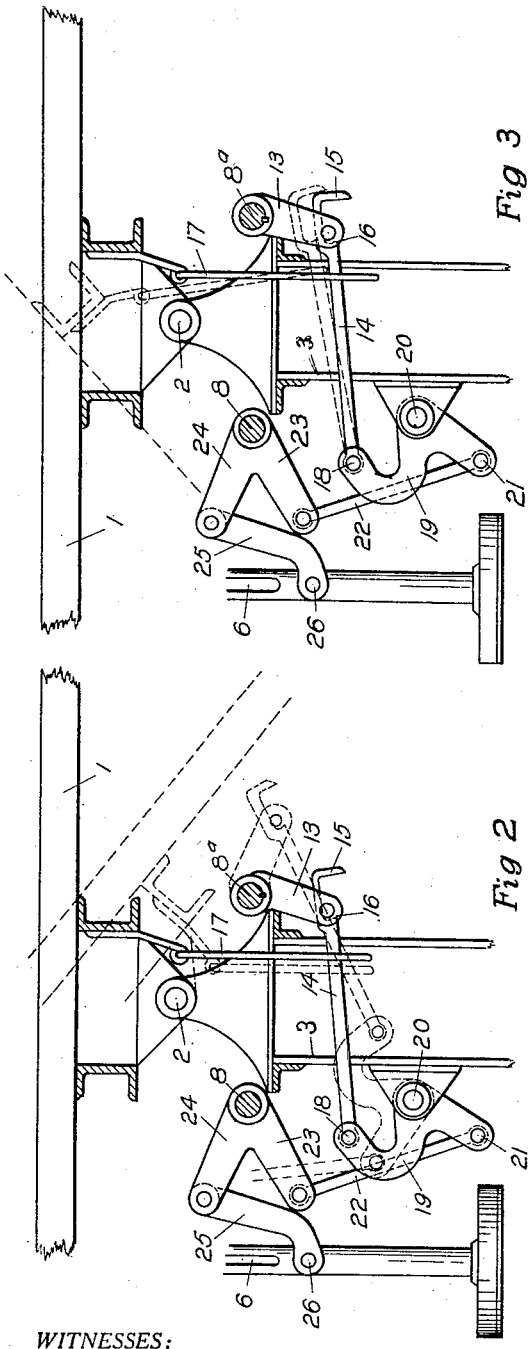
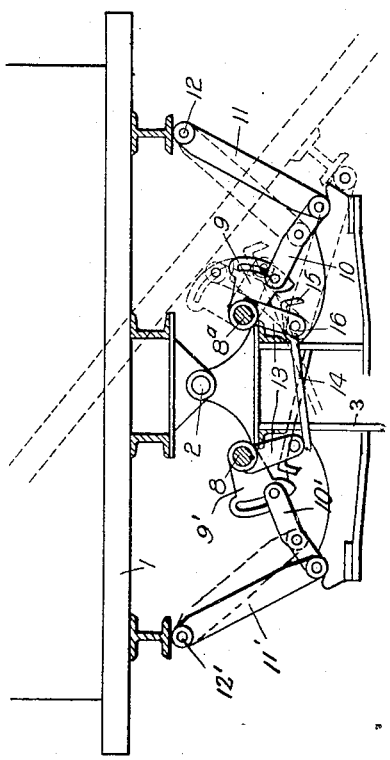
WITNESSES:
O. E. Williams
R. L. Clapper
William L. Burner INVENTOR.
BY
ATTORNEYS.

W. L. BURNER.
DUMP CAR.
APPLICATION FILED MAR. 23, 1918.

1,330,977.

Patented Feb. 17, 1920.
3 SHEETS—SHEET 3.

WITNESSES:

UNITED STATES PATENT OFFICE.

WILLIAM L. BURNER, OF COLUMBUS, OHIO, ASSIGNOR TO KILBOURNE AND JACOBS MANUFACTURING COMPANY, OF COLUMBUS, OHIO, A CORPORATION OF OHIO.

DUMP-CAR.

1,330,977.  Specification of Letters Patent.  Patented Feb. 17, 1920.

Application filed March 23, 1918. Serial No. 224,182.

*To all whom it may concern:*

Be it known that I, WILLIAM L. BURNER, a citizen of the United States, residing at Columbus, in the county of Franklin and State of Ohio, have invented certain new and useful Improvements in Dump-Cars, of which the following is a specification.

My invention relates to dump cars and comprises means for tripping the lock which maintains the car against involuntary dumping; my lock tripping device is adapted to be actuated from one side of the car to effect an unlocking on the opposite side, and is preferably operated from the power cylinder which dumps the car. It is provided in duplicate preferably one on each side of the longitudinal middle of the car, and the embodiment of my idea herein shown and described includes a bar or rod extending across the car, and this bar comes into activity for tripping the lock when the car bed is being dumped toward the side toward which the bar extends.

In the drawings I show my tripping device adapted to a car having a compression lock member connected with the longitudinal shaft, and having the folding dumping or push members which have been shown in recent applications for patents.

Figure 5:
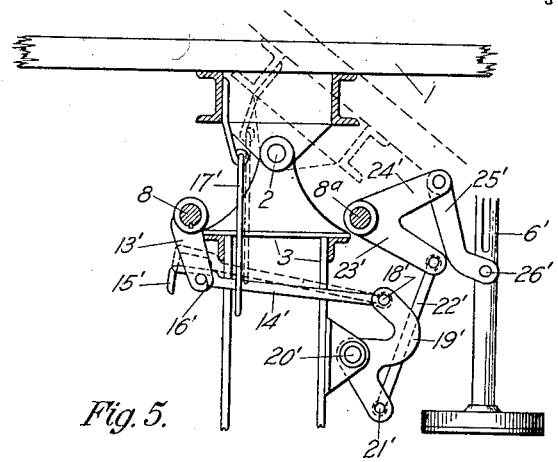
Figure 6:
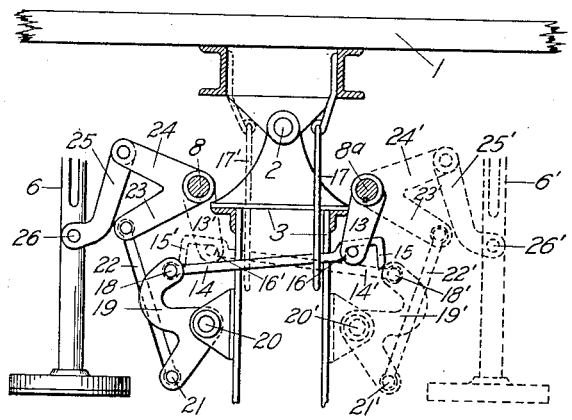
Figure 7:
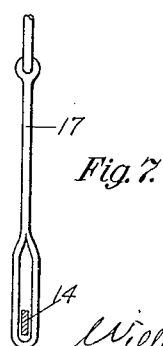

In the drawings which are hereto attached and hereby made a part of this specification Figure 1 is a vertical transverse section through the car containing my improvements associated with other operating features of the car; Fig. 2 shows the action of and the positions assumed by the tripping member when the car is dumped toward the side toward which the tripping member extends; Fig. 3 shows the same tripping member when the car bed is dumped in the opposite direction; Fig. 4 shows at the right the positions of the locking parts when normal and when tripped by my improved tripping member; Fig. 5 shows the lock tripping mechanism mounted on the opposite side of the car from that shown in Fig. 2; Fig. 6 shows the duplicate lock tripping mechanisms, that on the right being in dotted lines to indicate a more remote location; Fig. 7 is an edge view of the strap member adapted to lift the tripping bar.

Referring to the drawings 1 is a car bed pivotally mounted at 2 on the underframe 3 to dump laterally; the cylinder 5 contains the piston rod 6 adapted to lift the folding bar member 7 to cause the car bed to be dumped toward the right in the view presented. 8, $8^a$ are longitudinal shafts on opposite sides of the longitudinal axis of the car and as illustrated shaft $8^a$ rigidly carries the slotted member 9 engaging the link 10 pivotally associated with the compression lock bar 11 pivoted to the car bed at 12.

The member 13 rigidly borne on shaft $8^a$ is engaged by the hook end of the tripping bar 14, the shoulder 16 being adapted to exert a push on the rocker arm 13, and the hook 15 being adapted to engage and return said member to normal position when the car bed is righted. The strap 17 depending from the car bed is adapted to lift the tripping bar 14 out of engagement with the rocker arm 13 when the car bed is dumped toward the left as illustrated in Fig. 3.

The tripping bar 14 is pivoted at 18 to a lever 19 pivoted to the car underframe at 20 to swing about said point under the influence of the said piston rod exerted through the pivotal connection therewith at 21 of the rod 22 pivotally associated with the arm 23 carried loosely on shaft 8 in rigid association with arm 24 pivotally connected by link 25 with the piston rod 6 at 26.

In Fig. 1 the car bed is in normal position and all the operating parts are positioned correspondingly. Assume that the car bed is to be dumped toward the right; the rise of the piston rod 6 to accomplish the tilting of the car bed through the mechanism described above, rotates the lever 19 on its pivot 20 and pushes the tripping member 14 toward the right; the shoulder 16 engages the rocker arm 13 and rotates the shaft, the arm 13 lying in a position practically horizontal at the end of its travel. The effect of this movement has been to lift the slotted member 9 carrying therewith the link 10 and consequently pulling the lock bar 11 away inwardly and so permitting the car bed to descend at the right side as shown in Fig. 4.

A similar tripping bar and its associated mechanism are located on the right side of the car as shown in Figs. 5 and 6, to perform the unlocking when the car bed is to be dumped toward the opposite side. Preferably the mechanisms shown in Fig. 6 are disposed one on one side, the other on the other side, of the longitudinal center of the car, as there shown but that is a matter of mechanical application dependent upon other features of construction. The duplicate parts are given the same reference numerals with the addition of the prime character on all the mechanism operable from the right hand side of the car as clearly appears from an inspection of Figs. 5 and 6.

When the car bed is dumped toward the right as shown in Fig. 5, the strap member 17' being drawn up by the bed in its rotation lifts the bar 14' so that the shoulder 16' is out of engagement with the rocker arm 13', while the position of the arm 13' is undisturbed and remains so during the dumping and righting of the car bed, the purpose being to maintain the shaft 8 in its locking position until the car bed is to be dumped toward the left. As the piston rod 6' travels upwardly to lift the car bed back to normal righted position the bar 14' is thrust laterally, but, as stated, during this thrusting movement is out of engagement with the rocker arm 13'. When the bar 14' is retracted by the return of the piston rod 6' to its normal position, it again rests in normal operating position in the rocker arm 13', since the return of the car bed to normal has also returned the strap 17' to normal position.

It will now be understood that if the car bed be dumped toward the left, as assumed in Fig. 3, the strap 17 lifts the tripping bar 14 out of operating engagement with rocker arm 13, and so maintains it during the righting process, which will take place by means of the movement of the piston rod 6. The rise of the piston rod 6 to accomplish the righting of the car bed necessarily thrusts the bar 14 to the right, and when the piston rod descends the bar 14 will be retracted. Meanwhile the strap 17 having been returned to its normal position by the return of the car bed to normal, the bar 14 will again rest in the strap member 17 as shown in heavy lines in Fig. 3.

The construction herein provided for is positive and automatic in its operation, and although susceptible of variations and modifications the drawings show a preferable embodiment thereof.

What I claim is:—

1. In a dump car having a longitudinal shaft disposed on each side thereof, an arm secured on said shaft, car bed locking devices on each side of said car adapted to be actuated by the movement of said shaft, a tripping bar mounted on each side of said car and extending across said car and engaging said arm on said shaft on the opposite side, a dumping cylinder on each side of said car, means connecting the piston rod of said cylinder with said tripping bar to rotate said shaft on said opposite side, and thereby to unlock said car bed to permit the dumping thereof toward said opposite side.

2. In a dump car having a longitudinal shaft disposed on each side thereof, an arm secured on said shaft, car bed locking devices on each side of said car adapted to be actuated by the movement of said shaft, a tripping bar mounted on each side of said car and extending across said car and engaging said arm on said shaft on the opposite side, a dumping cylinder on each side of said car, means connecting the piston rod of each of said cylinders with said appropriate tripping bar to cause the unlocking of said car bed on the side thereof opposite to said dumping cylinder, the cylinder on said opposite side being adapted to be actuated subsequently to right said car bed, and means adapted to lift said tripping bar actuated from said righting cylinder out of engagement with said arm on said opposite shaft to prevent the rotation of said latter shaft out of its locking position during the righting operation.

3. In a dump car having a longitudinal lock shaft and a dumping cylinder mounted on each side thereof, an arm rigidly mounted on each of said shafts, a tripping bar associated with and actuated by each of said dumping cylinders adapted to engage the arm on the opposite side of said car to rotate the shaft on that side when said dumping cylinder is operated to dump said car bed, said other cylinder being adapted for operation subsequently to right said car bed, a strap member depending from said car bed to engage each of said tripping bars, whereby the tripping bar is lifted away from engagement with the arm on the side of the car bed lifted in the dumping operation and the unlocking of the shaft on said latter side during the subsequent righting operation is prevented.

4. In a side dumping car having at each side thereof a dumping cylinder, bed locking means, and a longitudinal shaft, an arm mounted on said shaft, a member on said shaft associated with said locking means to control the same, a tripping bar associated with each of said dumping cylinders and adapted to be actuated thereby and extending across the car and positioned for engagement with said arm on the opposite side, a strap member depending from the car bed for lifting engagement with each of said tripping bars, whereby when said car bed is dumped toward one side said tripping bar rotates said shaft and unlocks the car bed on that side, while said depending strap member during the dumping operation lifts said tripping bar on the rising side away from engagement with said arm to prevent unlocking movement of said arm during the righting operation.

5. In a dump car having a bed mounted for dumping in both directions and having at each side thereof a longitudinal shaft and a cylinder for dumping or righting said car bed, and car bed locking means adapted to be actuated by said shaft, an arm on said shaft, a tripping bar associated with each cylinder extending across said car and engaging the opposite arm, said cylinder at one side being adapted to dump said car bed toward the opposite side and at the same time initially to actuate said tripping member to move the opposite arm to rotate the opposite shaft to unlock said car bed on that side, and a strap depending from said car bed for engagement with the said tripping bar which is not utilized during the dumping operation, whereby said bar is lifted out of engagement with the arm by the car bed in its dumping movement and is held out of engagement with said arm while said car bed is being righted.

6. In a car adapted for dumping at both sides, car bed locking means at each side, a cylinder at each side of the car either of which is effective for dumping and the other for righting the car bed, lock tripping means connected with each cylinder to be actuated thereby to release the locking means on the opposite side to permit the car bed to be dumped to that side, and means mounted on the car bed to prevent the tripping means connected with the righting cylinder from tripping the locking means on the other side during the righting operation.

In testimony whereof I affix my signature in the presence of two witnesses.

WILLIAM L. BURNER.

Witnesses:
   F. C. EATON,
   R. SEWELL.